UNITED STATES PATENT OFFICE.

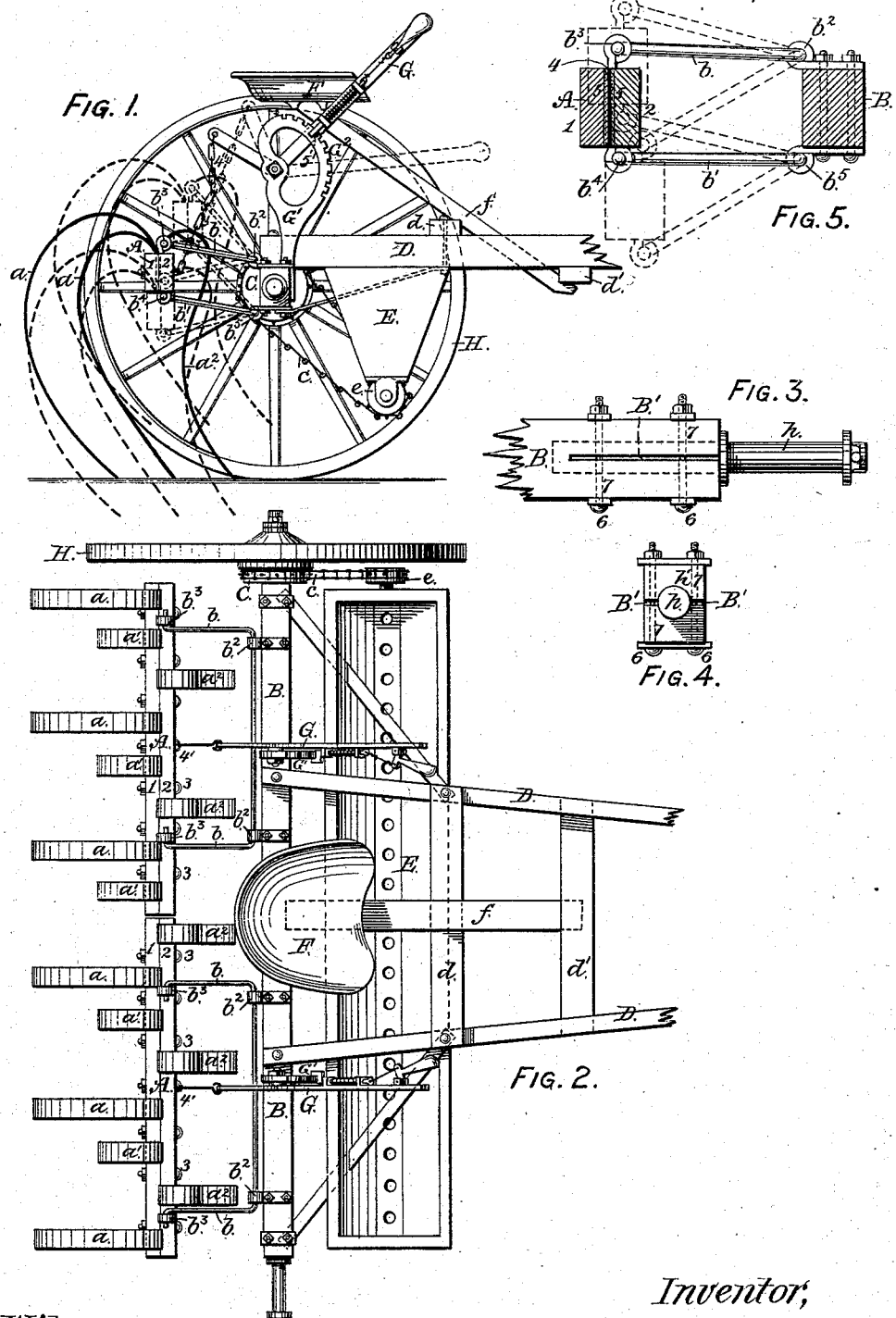

CHARLES LA DOW, OF ALBANY, NEW YORK.

SULKY-HARROW.

SPECIFICATION forming part of Letters Patent No. 251,900, dated January 3, 1882.

Application filed May 25, 1881. (No model.)

*To all whom it may concern:*

Be it known that I, CHARLES LA DOW, a citizen of the United States, residing at Albany, in the county of Albany and State of New York, have invented new and useful Improvements in Sulky-Harrows, of which the following is a specification.

My invention relates to harrows and seeders in which is employed an axle mounted on carrying-wheels and provided with a tongue or thills, and carrying a seed-box having seed-dropping mechanism actuated by the carrying-wheels, and provided with two or more series of spring-teeth, carried by a tooth-head hinged rearward to the axles, and mechanism for holding said teeth on different planes selected.

The invention consists in the combination, with an axle supported by carrying-wheels, of a tooth-head, vibratory spring-teeth thereon, and duplex hinged arms, all in such manner that the tooth-head will not cant in either direction when elevated or depressed to different planes.

The invention also consists in the combination, with a supporting-axle, carrying-wheels, and a tooth-head hinged to said axle so that it will not cant or turn when being elevated or depressed, of two or more series of vibratory spring-teeth, which will be raised or depressed simultaneously with the points of the teeth of one series on uniform horizontal planes with the points of the teeth of the other series in every degree of elevation and depression.

The invention also consists in the combination, with a supporting-axle, vibratory spring-teeth mounted on a tooth-head, and duplex arms hinging said tooth-head with said axle, of a lever provided with a dog operating with a segmental rack attached to the axle or frame and a rod connecting said tooth-head to said lever, whereby the tooth-head can be adjusted vertically and held set in any position.

The invention comprises other features of novelty, which will be fully hereinafter described in detail, and pointed out in the claims.

In the accompanying drawings, Figure 1 represents a side elevation of the machine with its nigh wheel removed, and illustrating the several parts of my improved harrow and seeder. Fig. 2 is a horizontal view of the same. Fig. 3 is a side elevation of an end section of the axle. Fig. 4 is an end view of the axle at its spindle, and Fig. 5 is a cross-sectional view of the axle and tooth-head and duplex arms which hinge the same together.

In the drawings, A A represent the tooth-head. B is the axle. H are the carrying-wheels, mounted on spindles $h$, secured in the ends of axle B. D D is the split tongue, composed of bars secured at their rear ends to axle B and stiffened by cross-bars $d\ d'$; and E is the seed-box.

The tooth-head A is made in sections, which sections are hinged to axle B by means of yoked arms $b$ and $b'$. These yoked arms are arranged in pairs, one pair, $b$, above the upper plane of the axle and the other pair, $b'$, below the lower plane of the same, as shown in Fig. 5. The arms $b$ are made in connection with each other in their forward end portions, and are hinged to the axles by eyes $b^2$, and the rear ends terminate with hooks which hinge with eyes $b^3$, attached to the tooth-heads A, as shown in Fig. 2. The arms $b'\ b'$ are employed in pairs, connected and formed substantially as arms $b\ b$, and hinged to axle B by eyes $b^5$ and to the tooth-head by eyes $b^4$. By this manner of hinging the tooth-head to the axle by the upper and lower arms, $b$ and $b'$, the said tooth-bar is adapted to be raised or depressed without tilting in either direction, as indicated by dotted lines in Fig. 5—that is to say, whether the tooth bar or head is raised or depressed, its upper surface will be on a true horizontal plane, with the front and rear sides ranging parallel with the vertical sides of the axle.

The tooth-head, as before stated, is made in sections, and two or more sections may be employed. Each section is hinged to the axle by arms $b$ and $b'$, as shown in Figs. 2 and 5, and may each be depressed or elevated independently of the other by proper mechanism. The said tooth-head in its sectional parts is formed by means of two parallel and contiguous bars, 1 and 2, clamped by bolts 3, Fig. 2. Made in the contiguous sides of the parallel bars 1 and 2 are vertical recesses 4. In the backs of said recesses are set rubber or equivalent elastic cushions 5, which clamp the sides of the shanks of the harrow-teeth $a$, $a'$, and $a^2$, and hold them in an elastic manner in the tooth-bar. The shanks of the said teeth are placed in said elastic recesses and the bolts 3 are tightened, when the pieces 1 and 2 will be made to tightly clamp the said teeth and hold them firmly in position and prevent them from working sidewise or edgewise, while at the same time these recesses admit the upper ends of the teeth to be adjusted vertically in either direction.

Figs. 1 and 2 show three sets or classes of teeth employed—viz., $a$, $a'$, and $a^2$. These teeth are made of flat carriage-spring steel and well tempered, and are secured in each section of the tooth head or bar A by being clamped between the pieces 1 and 2, composing said sections, as shown in Fig. 2 and indicated by dotted lines in Fig. 1. The teeth of each set or class are made with the same degree of extension of their lower ends or points from the upper surface of the tooth-head as the teeth of the other set or classes, as shown in Fig. 1. This equal and uniform extension of the lower ends or points from the upper side of the tooth-head causes the points of the teeth of each class when on or in the soil to be on the same horizontal plane one with the other, and when elevated or depressed by the tooth-head and the double pair of arms $b$ $b'$ the points of each set will be on the same horizontal plane with the points of those of the other set, as shown by dotted lines in Fig. 1. The teeth $a^2$ of the forward set are made with ogee or double-curved form, as shown in Fig. 1, in order to be better sustained when encountering the greatest resistance offered to the harrow, by reason of their being in advance of the teeth of the other set and first engaging with the soil to break the same in advance of the more rearward teeth. The said teeth $a^2$ are so located in front of the tooth-bar that when they meet with excessive resistance—say from hardened or baked soil—so as to be forced or sprung rearward, they will have support against said tooth-bar and be thereby stiffened to overcome such excessive resistance. The teeth $a'$ are each made with a sharp-curved form in their upper half or portions, which sharp-curved upper portions operate to react against the resistance offered to it by the soil partially broken by the preceding teeth $a^2$, and though not so stiff as teeth $a^2$ the said teeth $a'$ are well adapted to break or pulverize the soil they engage with without being sprung or forced rearward to any great extent. The teeth $a$ are each made with a more extended curve than that employed in teeth $a'$, which curve begins at the upper end portion of said teeth and gradually enlarges as it approaches the lower or point end of the same, so that the said teeth are made to be less stiff than the teeth preceding them. The teeth of each set are arranged in relation to those of the other set so as to be out of range and dodging each other, as shown in Fig. 2, in which the stiffer teeth $a^2$ will precede and be followed by the less stiff teeth $a'$, which less stiff teeth will be followed by the more limber teeth $a$, with the teeth of each set moving in direction to the line of draft and parallel with those of the other set, by which the soil will be operated with at about the same uniform distance apart.

Mounted on axle B are brackets G' G'. Pivoted to the upper ends of each of said brackets is a lever, G, provided with an elastic dog, which dog is adapted to engage with a segmental rack, $G^2$, made with the upper end of each bracket, as shown in Fig. 1. The short limb of each of the levers G is connected to one of the tooth-heads A by a chain, 4'', as shown in Fig. 1, or connecting-rod 4', as shown in Fig. 2. When connecting-rods 4' are employed, as shown in Fig. 2, the tooth-heads will be elevated or depressed by the operation of the levers G, and held in any set position by the operation of dogs 5' and racks $G^2$. I would therefore prefer to use said connecting-rods instead of chains shown in Fig. 1, as the driver will thereby be able to better depress the teeth to a greater or less degree, as may be selected, without employing weights.

The seed-box E is supported from beneath the frame-work of the split tongue D and forward of axle B, as shown in Figs. 1 and 2, and is made with any of the well-known forms, and provided with seed feeding and dropping mechanism of any known kind which may be selected, which mechanism is operated by a sprocket-wheel, $e$, actuated by chain $c$, driven by a larger sprocket-wheel, C, secured to one of the wheels H of the machine. This situation of the seed-box below the plane of the axle and forward of the same, and at a distance in advance of the teeth, operates to cause the seed to be delivered from the machine at near the surface of the soil and be deposited thereon before the teeth are advanced to them, so that the advancing teeth will by the respective sets gradually work the seed into the soil at a distance relatively rearward of deposit, and at an interval of time greater than heretofore had in seed-planters.

The axle B has its ends pierced longitudinally with a hole, $h'$, about one and one-eighth inch diameter, more or less, and corresponding with the diameter of the spindle $h$, to a depth of from six to eight inches, more or less. The said ends are bifurcated in direction of their length by a saw-kerf, B', Figs. 3 and 4. The said axle ends are also pierced with holes 7 in a transverse direction. The spindles $h$ are each inserted into the hole $h'$, and the wood of the forks of said ends are drawn toward each other and tightly on the inserted portions of the spindle, and made to securely clamp the same by simply tightening the nuts of bolts inserted in holes 7, Figs. 3 and 4, when the spindles will be securely held with the axle. The said spindles are readily detachable, and when detached there will be no projection of parts beyond the ends of the tooth-bar or seeder, so that the machine will be in more compact form for storage or transportation on either cars or boats, and the spindles will not be liable to be bent or injured, as they may be compactly stored in with the other parts of the machine.

The manner in which the several parts of my improved harrow and seeder operate is as follows: The tooth-bar, being hinged to the axle by duplex arms, as shown and described, will in all cases on the several planes, elevated or depressed, be held from canting in either a forward or rearward direction, and will therefore hold the points of the teeth of the several series attached to it on the same plane. The tooth-bar, being made in sections and hinged to the axle, will be free to conform in their horizontal lines of direction to the undulations of the soil passed over, and cause the teeth operating with undulating soil to operate uniformly with the same, and by means of the yoked arms hinging the said tooth-head to the axle the said tooth-head will be held firm against all end strain, which is incidental with the operation of turning a land.

The tooth-head, being composed of parallel clamping-bars provided with recesses for receiving the shanks of the teeth and clamping-bolts for forcing the bars in clamping operation against the teeth, firmly holds the teeth in their vertical or normal position, and permits the same to be rigidly and variously adjusted in a vertical direction, so as to increase or lessen the length of extension of the points of the teeth from the top side of the tooth-head. The recesses receiving the shanks of the teeth being backed by elastic pieces, the teeth will better encounter sudden shocks of resistance without injury to either the teeth or tooth-head. The ogee form of the teeth of the advanced series gives increased strength to the same without impairing their elasticity, and causes the advance teeth to more effectually break up the soil, so that the points of the more rearward teeth will by their elasticity and curved form be made to have greater vibrating motion with the soil as they are drawn forward.

By the employment of two or more series of teeth with a single (or sectional) tooth-head a single instrumentality is made to hold the teeth of the several series in digging contact with the soil, and the teeth of the more rearward series are made to more effectually operate with the soil by reason of the closer proximity of the points of the teeth of the several series.

By means of the hand-lever and the connecting rod or chain connecting the lever with the tooth-head the operator will readily elevate the tooth-head and lift the points of the teeth of the several series free from the soil, and also enables the driver to quickly lift the teeth for discharging any stone or obstruction which might engage with the same, and by means of the pole, tongue or thills, and hand-lever provided with dog, operating with a segmental rack and connecting-bar pivoted to the tooth-head and lever, the operator may at will sit and hold the teeth at any selected plane for digging to a greater or less depth in the soil, and thereby obviate the employment of weights, as the animal supporting the pole or thills will, through the lever and its connecting-rod and its dog and the segmental rack, hold the tooth-head as firmly in the position set to as if no hinged connection of the tooth-head with the axle was employed.

By reason of the seed-box and its dropping mechanism being situated forward of the axle and below the frame of the machine, and the points of the teeth operating with the soil being rearward of the axle, the seed dropped from the seed-box will be deposited on the ground before the teeth will operate with the soil for covering the same, and the seed will be effectually covered by the operation of the more limber teeth rearward in the machine. By means of the pierced and bifurcated ends of the axle and the clamping-bolts the spindles of the wheels may be readily removed, so that the parts of the machine will be more compact for storage and transportation, and no outwardly-projecting spindles will interfere with such compact storage.

These above-described improvements enable the machine to be compactly made in all its parts, and give to the operating parts great efficiency and economy of construction, and enable the driver to have full control over the operations of the machine, while the teeth, by reason of being secured at their shanks to a tooth-head on the same vertical plane with their points on different vertical planes, will prevent undue rocking of the tooth-head and the teeth, and the points of the teeth on the ground being between the tread of the wheels and a line drawn on a vertical plane with the rear side of the wheel, the points of the said teeth will follow close to the tread of the wheel, and be carried down at depressions of the soil and rise with the elevations of the soil, so that the points of the teeth will run uniformly at about the same depth, whether the machine is being drawn on level surfaces, ridges, or furrows, while at the same time the machine rearward of the axle will be so shortened that it may be made to easily turn a corner without exerting any great resistance from leverage against the team.

Having fully described my invention, what I desire to claim and secure by Letters Patent is—

1. In a harrow, the combination, with an axle, B, supported by carrying-wheels, of a tooth-bar, A, vibratory spring-teeth thereon, and duplex hinged arms $b$ $b'$, for operation substantially as set forth.

2. In a harrow, the combination, with a supporting-axle, carrying-wheels, and a tooth-head hinged to said axle so that it will not cant or turn when being elevated or depressed, of two or more series of vibratory spring-teeth, which will be raised or depressed simultaneously with the points of the teeth of one series on uniform horizontal planes with the points of the teeth of the other series in every degree of elevation and depression, substantially as set forth, for the purpose specified.

3. In a harrow, the combination, with a supporting-axle, vibratory spring-teeth mounted on a tooth-head, and duplex arms hinging said tooth-head with said axle, of a lever provided with a dog operating with a segmental rack attached to the axle or frame and a rod connecting said tooth-head to said lever, whereby the said tooth-head can be adjusted vertically and held set in position, substantially as and for the purpose set forth.

4. In a harrow, the combination, substantially as described, with a supporting-axle, carrying-wheels, and tongue or pole, of a sectional tooth-head hinged by duplex arms to said axle and provided with two or more series of vibratory spring-teeth, and mechanism by which said tooth-head will be elevated or depressed and held in any set position, substantially as set forth.

5. In a harrow, the combination, with axle B and sectional tooth-head A, carrying vibratory spring-teeth, of duplex yoked arms and eyes, as described, attaching said yoke-arms to the axle and tooth-head, respectively, whereby the sections of said tooth-bar will be held from swaying endwise in their hinged connection with said axle, substantially as set forth.

6. In a harrow, the combination, with a tooth-head, A, which is hinged rearward to an axle by duplex arms which will hold said tooth-head from canting or turning when moved vertically, of two or more series or classes of spring-teeth, as described, each of different degrees of stiffness, and having the points of each series on the same horizontal plane during all stages of the oscillation of the tooth-head, substantially as and for the purpose set forth.

In testimony whereof I have hereunto set my hand in the presence of two subscribing witnesses.

CHARLES LA DOW.

Witnesses:
WM. W. DIAMOND,
B. F. EATON.